No. 12,461. REISSUED FEB. 27, 1906.

E. FAHL.

GAME APPARATUS.

APPLICATION FILED AUG. 30, 1905.

2 SHEETS—SHEET 1.

Witnesses:
G. A. Pennington
A. J. McCauley.

Inventor:
Eugene Fahl,
Bakewell & Cornwall
Attys.

No. 12,461. REISSUED FEB. 27, 1906.

E. FAHL.

GAME APPARATUS.

APPLICATION FILED AUG. 30, 1905.

2 SHEETS—SHEET 2.

Witnesses:
G. A. Pennington
A. J. McCauley

Inventor:
Eugene Fahl,
by Bakewell & Cornwall
Attys.

UNITED STATES PATENT OFFICE.

EUGENE FAHL, OF ST. LOUIS, MISSOURI.

GAME APPARATUS.

No. 12,461. Specification of Reissued Letters Patent. Reissued Feb. 27, 1906.

Original No. 787,161, dated April 11, 1905. Application for reissue filed August 30, 1905. Serial No. 276,452.

*To all whom it may concern:*

Be it known that I, EUGENE FAHL, a citizen of the United States, residing at St. Louis, Missouri, have invented a certain new and useful Improvement in Game Apparatus, of which the following is a full, clear, and exact description, such as will enable others skilled in the art to which it appertains to make and use the same, reference being had to the accompanying drawings, forming part of this specification, in which—

Figure 1:
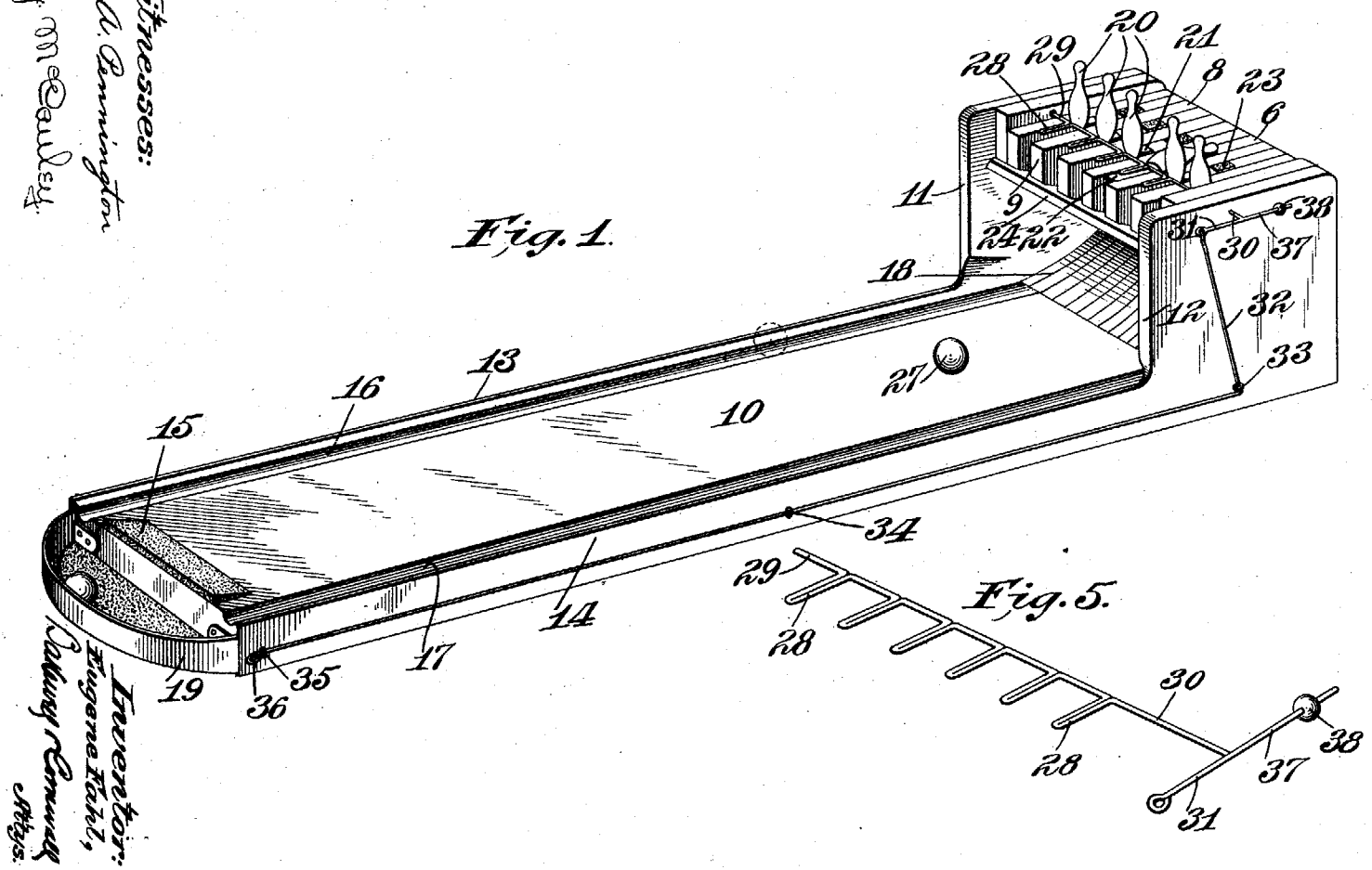
Figure 2:
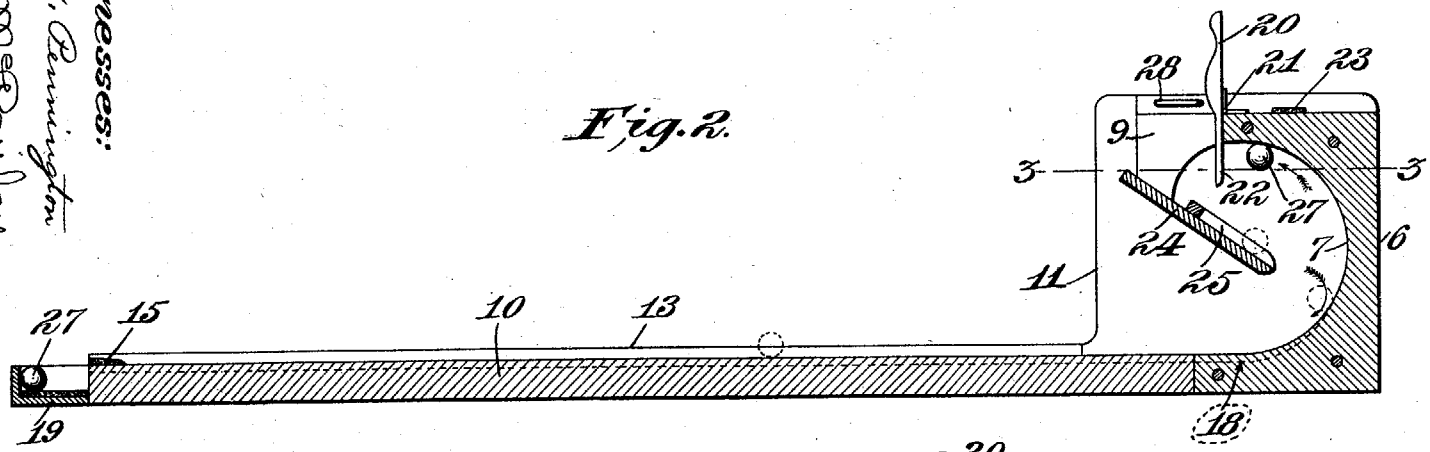
Figure 4:
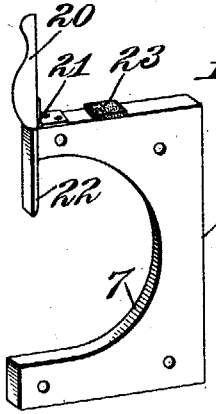
Figure 3:
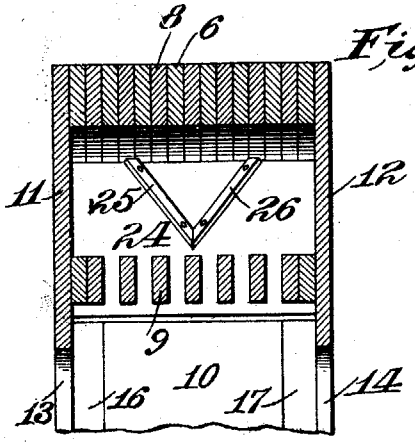

Figure 1 is a perspective view of my improved game apparatus. Fig. 2 is a longitudinal vertical sectional view. Fig. 3 is a horizontal sectional view on the line 3 3 of Fig. 2. Fig. 4 is a detail view of a section of the rear end of the alley, showing a pin pivoted to the upper forward edge thereof; and Fig. 5 is a detail view of the pin-restoring device.

This invention relates to a new and useful improvement in game apparatus, the object being to provide an apparatus of the character described upon which a game similar to the game of tenpins may be played, the ball being delivered onto the horizontal portion of the alley by the player, which ball when it reaches the rear end of the alley is conducted upwardly and forwardly by an upwardly-extending reflex curved portion, at the upper forward terminus of which are arranged a series of pivoted pins. These pins are designed to be swung on their pivots by a ball, the ball being then received upon an inclined plate and delivered to lateral runways connecting with forwardly-extending ball-troughs, whereby the ball may be returned to the forward end of the alley. Means are also provided for restoring the pins to vertical position after they have been swung on their pivots by a ball, said means being operable from the forward end of the alley.

Referring to the drawings in detail, in the construction of my improved game apparatus I take the blocks 6 and cut out half-circles from their forward edges to form the semicircular faces 7. Spacing-blocks 8 are placed between the blocks 6, the spacing-blocks being of substantially the same form as the blocks 6 and having forwardly and downwardly extending projections 9. The blocks 6 and 8 are arranged alternately and secured together with the curved semicircular faces 7 in alinement. A flat board 10 extends forwardly from the blocks, the surface of the board matching with the semicircular faces 7, and side pieces 11 and 12 are placed one on each side of the blocks, and side pieces 13 and 14 are placed one on each side of the board in alinement with the side pieces 11 and 12. A cushion 15 is mounted upon the forward end of the board 10, and longitudinally-extending grooves 16 and 17 are formed at the junction of the side pieces 13 and 14 with the board 10, said grooves being in alinement with the two outer blocks 8. The semicircular faces 7 of said outer blocks are cut away, as indicated by the dotted lines 18, to match with the surfaces of the grooves. A tray 19 is attached to the forward end of the board 10 to receive the balls. The pins 20 are connected to the forward upper corners of the blocks 6 by hinges 21, and wings 22 extend downwardly from the pins in front of the upper ends of the semicircular faces 7. Felt cushions 23 are secured to the upper edges of the blocks 6, so that when the pins fall backwardly they will strike these cushions and the cushions will serve to deaden the sound. A baffle-plate 24 is secured to the lower ends of the projections 9, said baffle-plate reaching from the side piece 11 to the side piece 12 and extending backwardly and downwardly, and guide-strips 25 and 26 are secured to the upper face of the baffle-plate 24 in the form of an inverted V. Balls 27 are used in connection with my game apparatus, and the operator or player will take a ball, lay his hand upon the cushion 15, and shoot the ball backwardly along the board 10 in the same manner as marbles are shot, and the ball will roll along the board 10 backwardly and upwardly and forwardly along the semicircular faces 7 and strike one or more of the wings 22, thereby tipping one or more of the pins 20 backwardly. The wings 22 are so close together that the balls cannot pass between; but if one or more of the pins have fallen the ball may pass in the space normally occupied by the fallen pin. After the ball strikes the wings 22 it will fall upon the baffle-plate 24 and roll backwardly along one of the guides 25 or 26 and then roll downwardly and forwardly along one of the grooves 16 or 17.

The setting-up device is formed of wire and comprises fingers 28, spaced accurately apart to fit between the blocks 8 in front of the blocks 6 and the ends 29 and 30, extending through bearings in the side pieces 11 and 12. A crank-arm 31 extends forwardly from the end 30, and a cord 32 extends downwardly through a bearing-eye 33 and then forwardly through guide-eyes 34 and 35, and the ring 36, attached to the forward end of the cord, is in position at the front end of the apparatus, so that the player may manually engage the ring and pull the cord, thereby depressing the forward end of the crank-arm 31, pressing the fingers 28 downwardly between the projections 9, bringing the wings 22 downwardly to their vertical positions, and setting the pins in their upright position.

The arm 37 extends backwardly from the end 30, and a counterbalancing-weight 38 is mounted upon the rear end of this arm and holds the fingers 28 normally in their horizontal positions, so that the pins may fall backwardly and the wings swing forwardly without obstruction.

My game apparatus partakes of the nature of a tenpin-alley; but it is constructed upon a smaller scale, and the alley is so constructed that the balls must travel along a semicircular face before coming in contact with the pins or with the wings which operate the pins.

I have provided means of returning the balls to the player and means of setting up the pins, and the essential details of construction are very much different from an ordinary tenpin-alley.

When the ball is discharged forwardly from the upper end of the curved surface, it will strike the baffle-plate, and as it rolls backwardly down the baffle-plate it will be guided to one side or the other by the guide-strips, and as the ball passes from the baffle-plate it will strike the lower part of the curved surface and roll forwardly down the curved surface to one of the grooves 16 or 17, and in passing down this curved surface the ball will acquire momentum sufficient to return it to the forward end of the board. The returning of the ball to the player is one of the most important features of my invention.

In terms my game apparatus comprises a ball-surface having a flat level portion and having a curved portion extending upwardly from the rear end of the flat portion and discharging forwardly, a baffle-plate to catch the ball from the upper part of the curved portion and discharge it back to the lower part and sides of the curved portion, grooves to conduct the ball back to the player, and side boards to hold the ball upon the ball-surface.

Having thus described the invention, what is claimed as new, and desired to be secured by Letters Patent, is—

1. In a game apparatus, a board, means forming a semicircular surface leading upwardly and forwardly from the rear end of the board, and pins pivotally mounted and having wings extending below the upper end of the semicircular surface; substantially as described.

2. In a game apparatus, a board, a semicircular surface extending upwardly and forwardly from the end of the board, a baffle-plate in front of and below the upper end of the semicircular surface, and pins pivotally mounted, with wings extending below the upper end of the semicircular surface; substantially as described.

3. In a game apparatus, a board, a semicircular surface extending upwardly from the rear end of the board, grooves extending along the sides of the board, a baffle-plate in front of and below the upper end of the semicircular surface, and guide-strips upon the baffle-plate; substantially as described.

4. In a game apparatus, the rectangular block 6 having the semicircular forward faces 7, the spacing-blocks 8 between the blocks 6, the projections 9 at the forward upper ends of the blocks 8, the pins 20 pivoted to the upper forward corners of the blocks 6; and the wings 22 extending downwardly from the pins 20; substantially as described.

5. In a game apparatus, the rectangular block 6 having the semicircular faces 7, the spacing-blocks 8 between the blocks 6, the projections 9 at the forward upper ends of the blocks 8, the pins 20 pivoted to the upper forward corners of the blocks 6, the wings 22 extending downwardly from the pins 20, the baffle-plate 24 attached to the projections 9, and the guide-strips 25 and 26 secured to the baffle-plate; substantially as described.

6. In a game apparatus, a ball-surface having a flat level portion, and having a curved portion extending upwardly from the rear end of the flat portion and discharging forwardly, a baffle-plate to catch the ball from the upper part of the curved portion and discharging it back to the lower part and sides of the curved portion, a groove upon each side of the ball-surface to conduct the ball back to the player, and side boards to hold the ball upon the ball-surface; substantially as described.

7. In a game apparatus, the combination with an alley having a horizontal portion and an upwardly-extending reflex curved portion, a baffle-plate upon which the ball is delivered after it leaves the upper forward extremity of said curved portion, means on said baffle-plate for directing the ball to one side thereof, and a trough or channel for receiving the ball after it leaves the baffle-plate and returning it to the forward end of the alley; substantially as described.

8. In a game apparatus, the combination with the horizontal portion of an alley, an upwardly-extending reflex curved portion connected to the rear end of said horizontal portion, pins, means for displacing said pins by a ball delivered onto the horizontal portion of the alley, a rearwardly-inclined baffle-plate in advance of the upper forward extremity of the reflex curved portion of the alley, said baffle-plate receiving the ball, and means for directing the ball to one side of the baffle-plate as it rolls down the incline thereof and for conducting the ball back to the front end of the alley; substantially as described 9. In a game apparatus, the combination of an alley having a horizontal portion and an upwardly-extending reflex curved portion connected to the rear end of said horizontal portion, a rearwardly-inclined baffle-plate arranged above the rear end of the horizontal portion of the alley and below the upper extremity of the curved portion thereof, whereby a ball leaving said curved portion will be delivered upon said inclined baffle-plate, and means for conducting the ball from said inclined baffle-plate to the forward end of the alley; substantially as described.

10. In a game apparatus, the combination of an alley having a horizontal portion and an upwardly-extending reflex curved portion connected to the rear end of said horizontal portion, a rearwardly-inclined baffle-plate arranged above the rear end of the horizontal portion of the alley and below the upper extremity of the curved portion thereof, whereby a ball leaving said curved portion will be delivered upon said inclined baffle-plate, and means for conducting the ball from said inclined baffle-plate to a trough substantially on the same plane as the horizontal portion of the alley and which leads to the forward end of the alley; substantially as described.

11. In a game apparatus, the combination with an alley having a horizontal portion and an upwardly-extending reflex curved portion at the rear end of said horizontal portion, a pin pivotally mounted upon the upper forward end of said curved portion, and means extending into the path of a ball and designed to be struck by a ball, whereby when the ball strikes said means said pin is swung on its pivot; substantially as described.

12. In a game apparatus, the combination with an alley having a horizontal portion and an upwardly-extending reflex curved portion at the rear end of said horizontal portion, a series of pins pivotally mounted upon a suitable support, and means extending into the paths of balls and designed to be struck by a ball, whereby when said means are struck by the ball said pins are swung on their pivots; substantially as described.

13. In a game apparatus, the combination with an alley having a horizontal portion and an upwardly-extending reflex curved portion at the rear end of said horizontal portion, pins pivotally mounted upon a suitable support, means extending below the upper end of said reflex curved portion and designed to be struck by a ball, whereby said pins are swung on their pivots, and a baffle-plate arranged below said means for receiving the ball and directing it laterally to a return-trough; substantially as described.

In testimony whereof I hereunto affix my signature, in the presence of two witnesses, this 14th day of August, 1905.

EUGENE FAHL.

Witnesses:
F. R. CORNWALL,
GEORGE BAKEWELL.